United States Patent Office 2,963,456
Patented Dec. 6, 1960

2,963,456

PRODUCTION OF BINDERS FOR SAND CORES

Joseph L. Betts, Jr., Westfield, and Herbert K. Wiese, Cranford, N.J., assignors to Esso Research and Engineering Company, a corporation of Delaware No Drawing. Filed Aug. 20, 1956, Ser. No. 605,917

5 Claims. (Cl. 260—23.7)

This invention relates to the production of binders for sand cores for metal casting and relates more particularly to a novel core oil composition and its method of preparation.

In the manufacture of cores for use in making metal castings, it is customary to mix sand with a binder, shape the core and then bake it. A vast number of materials have been suggested and tried as the binder in the preparation of such cores, but all of them are subject to various defects or disadvantages.

It has now been discovered that cores of very excellent quality can be made by using a binding agent which comprises a mixture of polymers of the dimers and codimers of cyclopentadiene, methylcyclopentadiene, higher alkylated cyclodienes and acyclic dienes together with drying oils such as soya bean, tall, fish, linseed, etc.

The mixtures of polymers of dimers and codimers which are mixed with the linseed oil to give the improved binder of this invention is obtained by subjecting a steam-cracked petroleum stream boiling between 80° and 350° F. to heat soaking at about 220° to 240° F. for 6–16 hours to dimerize the cyclic diolefins contained therein followed by separation of the undimerized material. The bottoms from a cyclopentadiene purification unit, which consist essentially of the dimer of methylcyclopentadiene, can also be used as feed. The cyclodiene dimers and codimers are polymerized as such or diluted with some inert diluent, such as Varsol, hexane, Solvesso 150, toluene, etc. The polymerization catalyst consists of a Friedel-Crafts type catalyst such as $BF_3$ and $AlCl_3$. In the case of $BF_3$ up to about 3% is used and the polymerization is carried out at a temperature between 25° and 175° F. and a contact time ranging from several minutes to 10 hours. When $AlCl_3$ is used, the catalyst is present in an amount between 0.1 to 10%, preferably between 1 and 2%, based on the cyclodiene dimers, and the temperature ranges between 25° and 212° F. Contact times ranging from several minutes to 10 hours can be employed depending on catalyst concentration and temperature. Depending on the feed and polymerization conditions the product ranges from a semi-solid material to a hard resin having a softening point of about 212° F.

The polymer is mixed with linseed oil in the ratio of two parts of polymer to one of linseed oil. A suitable comminuted core material, such as sand, zirconia, alumina, fluid coke, or the like is mixed with the polymer linseed oil mixture in suitable proportions, the polymer being in solution.

As solvents for the polymer, various ordinary organic solvents may be used, as for example, naphtha, toluene, Varsol, Solvesso 100, Solvesso 150, and the like.

In the practice of the invention, about 100 parts of core sand and one part of a mixture of linseed oil and polymer solution containing about two parts of polymer and one of linseed oil (based on the non-volatile portion) are thereby mixed to form a molding composition. These proportions may be varied to suit conditions, however. The mixture is then formed into a core of desired shape and baked at a temperature of about 350–450° F. to drive off the solvent and render the core hard and capable of resisting heat without fusion or softening. The length of time required for baking varies with the size of core, its shape and other conditions, and may vary from thirty minutes to several hours. Cores thus formed have greater cohesion, hardness and tensile strength than cores made with binders formerly employed, e.g. linseed oil.

The following examples are given to illustrate but not to limit the invention.

EXAMPLE I

A mixture consisting approximately of the dimers and codimers made from a monomeric mixture consisting of 41 wt. percent cyclopentadiene, 34 wt. percent methylcyclopentadiene, 6 wt. percent of $C_7$ cyclodienes, and 5 wt. percent of $C_5$ acyclic dienes and obtained by the heat soaking at 220–240° F. of a steam-cracked stream boiling between 80° and 350° F. was mixed with an equal volume of Varsol and polymerized with 1% boron fluoride at 35–95° F. The reaction solution was then washed to remove catalyst residues and stripped to a non-volatile content of 78.2%. This polymer solution was mixed with linsed oil in the following proportions.

*Core oil A*

Composition:
- Resin _____wt. percent__ 59.6
- Raw linseed oil _____do____ 23.3
- Varsol _____do____ 17.1
- Inspection NVM _____do____ 69.8
- Viscosity (SSU at 100° F.) _____ 143.5

The bottoms from a cyclopentadiene purification unit consisting of a mixture similar to the above, but from which 80% of the cyclopentadiene had been removed thus leaving essentially the dimer of methylcyclopentadiene was polymerized with about 1% $AlCl_3$ at 50–100° F. to give a semi-solid type polymer after stripping off all the Varsol. This polymer was mixed with linseed oil in the following proportions.

*Core oil B*

Composition:
- Resin _____wt. percent__ 62.8
- Raw linseed oil _____do____ 19.5
- Varsol _____do____ 17.6
- Inspection NVM _____do____ 58.4
- Viscosity (SSU at 100° F.) _____ 155

The same feed as used in forming core oil B was also polymerized with about 1% $BF_3$ and a solution of the resin obtained was formulated as follows:

*Core oil C*

Composition:
- Resin _____wt. percent__ 59.3
- Raw linseed oil _____do____ 23.4
- Varsol _____do____ 17.3
- Inspection NVM _____do____ 70.2
- Viscosity (SSU at 100° F.) _____ 128

Another fraction consisting of the dimers and codimers made from a monomeric mixture composed of 27.5 wt. percent cyclopentadiene, 44.4 wt. percent of methylcyclopentadiene, 8 wt. percent $C_7$ cyclodienes and 6.5 wt. percent $C_5$ acyclics was polymerized with aluminum chloride and a solution of the resin obtained was formulated as follows:

*Core oil D*

Composition:
- Resin _____wt. percent__ 61.5
- Raw linseed oil _____do____ 21.3
- Varsol _____do____ 17.2
- Inspection NVM _____do____ 63.8
- Viscosity (SSU at 100° F.) _____ 144

One part (based on the non-volatile portion) by weight of each of the above core oils was mixed with 100 parts of sand and three parts of water and baked at 350–450° F. The tensile strength of the resulting cores was determined and compared with the strength of similar cores obtained from linseed oil and the polymer alone. The following results were obtained:

| Core Oil | Bake T. °F. | Tensile Strength, lbs./sq. in. After minutes baking | | | | | | |
|---|---|---|---|---|---|---|---|---|
| | | 30 | 45 | 60 | 90 | 120 | 150 | 240 |
| Linseed oil | 390 | 65 | | | 293 | | 279 | |
| A | 390 | 175 | | | 317 | | 293 | |
| Linseed oil | 400 | 88 | | | 296 | | 296 | |
| A | 400 | 273 | | | 324 | 317 | | |
| A (without linseed oil) | 400 | 59 | | | 135 | | 151 | |
| Linseed oil | 350 | 30 | | | 138 | | 230 | |
| A | 350 | 96 | | | 326 | | 357 | |
| Linseed oil | 450 | 143 | | 269 | 261 | 211 | | 178 |
| A | 450 | 294 | | 309 | 290 | 263 | | 222 |
| B | 390 | 249 | | | 316 | | 269 | |
| C | 390 | 197 | | | 363 | | 342 | |
| Linseed oil | 390 | 61 | 154 | | 267 | | | |
| A | 390 | 157 | 316 | | 311 | | | |
| B | 390 | 184 | 274 | | 296 | | | |
| C | 390 | 226 | 321 | | 343 | | | |
| D | 390 | 206 | 305 | | 290 | | | |

The above results show that the mixture of linseed oil with polymer obtained by Friedel-Crafts polymerization of mixtures of dimers from the thermal soaking of steam-cracked fractions boiling between 80° and 350° F. is an excellent binder for sand cores when compared with linseed oil, the tensile strength in all cases being much greater than linseed oil and far greater than the resin alone which is in fact a poor binder by itself. Removing the cyclopentadiene from the feed to the polymerization improves the baking rate. Those resins obtained from $BF_3$ polymerization of feeds from which most of the cyclopentadiene had been removed have higher tensile strengths than those obtained from $AlCl_3$ catalyzed feeds.

The nature of the present invention having been thus fully set forth and specific examples of the same given, what is claimed as new and useful and desired to be secured by Letters Patent is:

1. A composition for making foundry cores comprising a comminuted core body material suitable therefor and a binder consisting of a natural drying oil, a resinous polymerization product and a solvent for said resinous product, said resinous product being prepared by the following steps: (1) providing a steam-cracked petroleum fraction boiling between 80° and 350° F.; (2) heat soaking the steam-cracked fraction at 220°–240° F. to dimerize the cyclic dienes; (3) separating the undimerized materials from the dimerized cyclic dienes; and (4) polymerizing the dimerized cyclic dienes in the presence of a Friedel-Crafts type catalyst.

2. A composition for making foundry cores comprising a comminuted core body material suitable therefor and a binder consisting of a natural drying oil, a resinous polymerization product and a solvent for said resinous product, said resinous product being prepared by the following steps: (1) providing a steam-cracked petroleum fraction boiling between 80° and 350° F.; (2) heat soaking the steam-cracked fraction at 220°–240° F. to dimerize the cyclic dienes; (3) separating the undimerized materials from the dimerized cyclic dienes; and (4) polymerizing the dimerized cyclic dienes in the presence of a Friedel-Crafts type catalyst at a temperature between 25° and 212° F.

3. A composition according to claim 2 in which the drying oil is linseed oil.

4. The process of making a metal casting core which consists in admixing sand with a mixture of linseed oil and a solution of a resinous polymerization product prepared by the following steps: (1) providing a steam-cracked petroleum fraction boiling between 80° and 350° F.; (2) heat soaking the steam-cracked fraction at 220°–240° F. to dimerize the cyclic dienes; (3) separating the undimerized materials from the dimerized cyclic dienes; and (4) polymerizing the dimerized cyclic dienes in the presence of a Friedel-Crafts type catalyst.

5. The process of making a metal casting core which consists in admixing sand with a mixture of linseed oil and a solution of a resinous polymerization product prepared by the following steps: (1) providing a steam-cracked petroleum fraction boiling between 80° and 350° F.; (2) heat soaking the steam-cracked fraction at 220°–240° F. to dimerize the cyclic dienes; (3) separating the undimerized materials from the dimerized cyclic dienes; and (4) polymerizing the dimerized cyclic dienes in the presence of a Friedel-Crafts type catalyst at a temperature between 25° and 212° F.

References Cited in the file of this patent

UNITED STATES PATENTS

| | | |
|---|---|---|
| 1,891,079 | Chittick | Dec. 13, 1932 |
| 2,047,297 | Stahl | July 14, 1936 |
| 2,274,618 | Remy | Feb. 24, 1942 |
| 2,387,895 | Gerhart | Oct. 30, 1945 |
| 2,390,530 | Gerhart et al. | Dec. 11, 1945 |
| 2,394,641 | Soday | Feb. 12, 1946 |
| 2,397,600 | Gerhart | Apr. 2, 1946 |
| 2,466,667 | Thomas | Apr. 12, 1949 |
| 2,659,654 | Tuttle | Nov. 17, 1953 |
| 2,753,326 | Hamner | July 3, 1956 |
| 2,773,051 | Leary | Dec. 4, 1956 |
| 2,779,750 | Fuqua et al. | Jan. 29, 1957 |
| 2,910,748 | Hammer et al. | Nov. 3, 1959 |

OTHER REFERENCES

Lee et al.: Paint, Oil and Chemical Review, pages 16–25, January 8, 1948.